US011230231B1

(12) United States Patent
Storer, II et al.

(10) Patent No.: US 11,230,231 B1
(45) Date of Patent: Jan. 25, 2022

(54) FLAG MOUNT FOR USE WITH VEHICLES HAVING TAILGATE SPARE TIRE CARRIERS

(71) Applicants: Elmer Dale Storer, II, Blue Creek, OH (US); Lisa Faye Storer, Blue Creek, OH (US)

(72) Inventors: Elmer Dale Storer, II, Blue Creek, OH (US); Lisa Faye Storer, Blue Creek, OH (US)

( * ) Notice: Subject to any disclaimer, the term of this patent is extended or adjusted under 35 U.S.C. 154(b) by 0 days.

(21) Appl. No.: 17/134,426

(22) Filed: Dec. 27, 2020

(51) Int. Cl.
| | |
|---|---|
| *B60R 9/06* | (2006.01) |
| *B62D 43/00* | (2006.01) |
| *B62D 43/02* | (2006.01) |
| *G09F 17/00* | (2006.01) |
| *B60R 11/00* | (2006.01) |

(52) U.S. Cl.
CPC .............. *B60R 9/06* (2013.01); *B62D 43/005* (2013.01); *B62D 43/02* (2013.01); *B60R 2011/004* (2013.01); *G09F 2017/0075* (2013.01)

(58) Field of Classification Search
CPC ....... B60R 2011/004; B60R 9/06; B60R 5/04; B60R 11/00; B62D 43/005; B62D 43/02; G09F 2017/0075
USPC ......... 116/173, 28 R; 224/42.13, 42.14, 488, 224/511; 248/539; 40/587, 591
See application file for complete search history.

(56) References Cited

U.S. PATENT DOCUMENTS

| | | | | |
|---|---|---|---|---|
| 3,166,199 | A * | 1/1965 | Hawkins | B62D 49/065 211/182 |
| 4,625,900 | A * | 12/1986 | Lawson | B60R 9/06 224/511 |
| 4,948,021 | A * | 8/1990 | Murphy | B60R 9/06 224/42.13 |
| 5,042,418 | A | 8/1991 | Hoover | |
| 5,118,017 | A * | 6/1992 | Buck | B62D 43/02 224/42.13 |
| 5,228,606 | A * | 7/1993 | Hickson | B60R 9/06 224/42.13 |
| 5,236,342 | A * | 8/1993 | Pellettier | B60R 11/06 224/512 |
| 5,427,287 | A | 6/1995 | Harrison | |
| 5,483,916 | A | 10/1996 | Kolvites | |
| 6,889,881 | B2 * | 5/2005 | Wilkens | B60R 9/065 224/509 |
| 6,918,520 | B2 | 7/2005 | Skinner | |
| 8,387,839 | B2 * | 3/2013 | Sautter | B60R 9/06 224/42.13 |
| 9,159,254 | B2 | 10/2015 | Oyoung | |
| 10,112,545 | B1 | 10/2018 | Gaskins | |
| 10,526,810 | B1 * | 1/2020 | Boos | E04H 12/2284 |
| 10,661,845 | B2 | 5/2020 | Wymore | |
| 10,672,307 | B2 | 6/2020 | Kesler | |
| 10,793,207 | B2 | 10/2020 | Smith | |
| 2015/0294605 | A1 * | 10/2015 | Conway | G09F 17/00 116/173 |
| 2019/0263461 | A1 * | 8/2019 | Rutman | B60R 9/06 |

* cited by examiner

*Primary Examiner* — Gregory W Adams
(74) *Attorney, Agent, or Firm* — Mark F. Smith; Smith Brandenburg Ltd.

(57) ABSTRACT

A flag mounting apparatus for mounting a pole for a flag, banner, marker and the like to a vehicle, such as a "jeep" type vehicle having a spare tire mounted to the tailgate of the vehicle. The flag mounting apparatus is mounted to a plurality of spare tire mounting bolts and have one or more flag mounts for receiving a securing a flag pole.

18 Claims, 19 Drawing Sheets

FLAG MOUNT FOR USE WITH VEHICLES HAVING TAILGATE SPARE TIRE CARRIERS

BACKGROUND OF THE INVENTION

The subject invention is directed to a mounting apparatus for mounting an object to a vehicle, such as an automobile, and more specifically, to a mounting apparatus for mounting a flag or banner, or other similar pole-type objects, to a "jeep" type vehicle having a spare tire mounted to the tailgate of the vehicle.

Apparatus for removably mounting flags to vehicles are well known. Such mounting apparatus often employ suction devices, such as suction cups, attached to one end of a flag holder which are adapted to be releasably secured to the body of the vehicle. Such mounting apparatus using suction cup systems may be adequate for use with small flags or for vehicles traveling at relatively low speeds, they often are inadequate for mounting larger flags or banners, particularly for vehicles traveling at relatively high travel speeds or when a highway, road or driving terrane is not smooth, such as off-road driving. In addition, suction components generally deteriorate over time, reducing their attachment strength. Larger and heavier flags or banners or objects using longer poles, particularly when being acted on by the force of the wind produced by the moving vehicle, make it difficult to maintain the suction cup's seal against the surface of the vehicle.

Other apparatus have been developed for mounting a flag or pole-type object to a vehicle, such as by use of a magnetic stand that removably attaches to the surface of a vehicle. Unfortunately, like apparatus that the use suction cups, while they may be adequate for mounting small flags and banners or other light weight objects or for vehicles traveling at relatively low speeds, they typically are inadequate for mounting larger flags or banners or heavier objects on vehicles or on vehicles traveling at relatively higher speeds. Another apparatus that has been developed is a window mounting system that has an outer flag support for attaching to a flag or banner pole on the outside of the vehicle and an inner attachment that extends and hooks to the top of the window and is secured in place when the window is closed. Again, such apparatus may be adequate for mounting a relatively small flag or banner, they are generally not adequate for mounting larger flags and banners. Further, the window cannot be opened during use which can make them undesirable for certain applications.

Apparatus have also been developed that have been shown to be more adequate for supporting larger flags and banners on vehicles. Such apparatus often is attached to various parts of the vehicle, such as to the bumper of the vehicle or, in the case of a pickup truck, are often connected using an opening often found on sidewall of the truck bed. Unfortunately, such apparatus for attaching a flag or banner to a vehicle are often difficult and/or time consuming to install or can result in the surface of the vehicle, such as the bumper or sidewall of the truck, being scratched.

Many vehicles, such as "Jeep" type vehicles have been designed to have a spare tire mounted to the tailgate of the vehicle. Such vehicles typically used for off-road driving and users often wish to mount a flag to the vehicle making it easier to be spotted by others. In addition, it is often desirable to mount flags or banners, such as political and sports flags and the like. Further, users may also wish to mount other objects such as antennas, such as CB antennas, when driving off-road. However, attaching a flag mount to the back of such a vehicle can interfere with the use of a factory installed backing camera that are now required on new vehicles.

Accordingly, it is desirable to have an apparatus for attaching a flag or banner, or other similar objects of different sizes, to a "jeep" type vehicle having a spare tire mounted to the tailgate of the vehicle, that can support various size objects, that are stable and secure at different driving speeds and terrain, that can be easily attached and detached to the vehicle, and will not interfere with the operation of a factory installed backing camera, and is relatively inexpensive to manufacture.

SUMMARY OF THE INVENTION

The subject invention is flag mounting apparatus for mounting to a spare tire mount attached to a tailgate of a vehicle. The flag mounting apparatus is attached to a spare tire mount having a vertical front surface and is vertically coupled to the tailgate of the vehicle by a plurality of threaded horizontal tire mounting bolts that extend from the vertical front surface and are aligning for mating with holes in a spare tire wheel for supporting a spare tire. The flag mounting apparatus of the subject invention comprises an attachment plate having a front face and a back face with a central opening extending through the attachment plate and a plurality of socket holes that align with the holes in the spare tire wheel and the threaded horizontal tire mounting bolt extending through each hole. The flag mounting apparatus further includes a plurality of horizontally extending sockets each having a proximal end opening and a distal end opening. The distal end opening of each horizontally extending socket aligns with and is adapted to receive a corresponding horizontally extending tire mounting bolt of the spare tire mount and are removably secured to the attachment plate by a socket attachment bolt extending through a corresponding socket hole in the attachment plate for mating with the proximal end opening of a corresponding socket. Secured to the front face of the attachment plate is at least one flag mount having a longitudinally extending channel for receiving a flag pole, such as a flag or banner pole, an antenna, and the like.

In a preferred embodiment of the invention the distal end opening of each horizontally extending socket are threaded and sized for effectively mating with threads of the threaded horizontally extending tire mounting bolt and the proximal end opening is threaded and sized for effectively mating with threads of a socket attachment bolt that extends through a socket hole in the attachment plate for coupling the attachment plate to spare tire mount.

In a preferred embodiment a flag mount includes threaded holes for receiving a corresponding threaded flag mounting bolt that extends through a corresponding flag mount opening in the attachment plate and mates with the threaded hole for securing the flag mount to the attachment plate.

In a preferred embodiment the at least one flag mount includes a first side opening and an aligned second side opening for receiving a pin that extends through the first side opening and through a hole in a flag pole and out through the aligned second side opening. The pin includes a pin head sized such that it cannot move through the first side opening and a second end that extends through the aligned socket second side opening and has a pin aperture for receiving a lock that operates to prevent the pin from being removed and securing a flag pole within the flag mount.

In a preferred embodiment the flag mounting apparatus includes a spare tire locking component that operates to prevent one or more of the threaded socket attachment bolts from being removed thereby locking the spare tire on the spare tire mount on the vehicle.

In a preferred embodiment the flag mounting apparatus comprises at least one flag mount that can be vertically rotated to a desired angle.

In a preferred embodiment the spare tire locking component includes a horizontally extending flap attached to the front face of the attachment plate and a cover covering one or more of the horizontal socket attachment bolts and having slot, wherein the horizontally extending flap extends through the slot in the cover and includes an opening for attaching a lock thereby preventing the horizontally extending flap from sliding through the slot thereby operating to secure the cover against the front face of the attachment plate.

In a preferred embodiment of the invention the flag mounting apparatus includes a spare tire cover having at least one pole cover opening that operates to allow a flag pole to extend therethrough.

In another preferred embodiment of the invention the cover includes a central opening that operates to allow the vehicle back-up camera to operate without interference from the cover.

A preferred embodiment of the invention is a flag mounting apparatus for use with a vehicle having a spare tire and wheel vertically mounted to the tailgate of a vehicle by a spare tire mount having a plurality of horizontally tire mounting bolts extending through corresponding holes in the wheel. The flag mounting apparatus comprises an attachment plate having a front face and a back face with a central opening extending through the attachment plate and a plurality of socket holes that align with the holes in the wheel of the spare tire and the horizontal tire mounting bolt extending through each hole. The flag mounting apparatus further includes a plurality of horizontally extending sockets each having a proximal end opening and a distal end opening. The distal end of each horizontally extending socket aligns with and is adapted to receive a corresponding horizontally tire mounting bolt of the spare tire mount and are removably secured to the attachment plate by a socket attachment bolt extending through a corresponding socket hole in the attachment plate for mating with the proximal end opening of corresponding socket. Secured to the front face of the attachment plate is at least one flag mount having a longitudinally extending channel for receiving a flag pole, such as a flag or banner pole, an antenna and the like. At least one flag mount includes a first side opening and an aligned second side opening for receiving a pin that extends through the first side opening and through a hole in a flag pole and out through the aligned second side opening. The pin includes a pin head sized such that it cannot move through the first side opening and a second end that extends through the aligned second side opening and has a pin aperture for receiving a lock that operates to prevent the pin from being removed and securing a flag pole within the at least one flag mount. The spare tire locking component includes a horizontally extending flap attached to the front face of the attachment plate and a cover covering one or more of the horizontal socket attachment bolts and having slot, wherein the horizontally extending flap extends through the slot in the cover and includes an opening for attaching a lock thereby preventing the horizontally extending flap from sliding through the slot thereby operating to secure the cover against The subject invention is a flag mounting apparatus for mounting to a spare tire mount attached to a tailgate of a vehicle and having a vertical front surface with a plurality of threaded horizontal tire mounting bolts that extend from the vertical front surface and are aligning for mating with holes in a spare tire wheel for supporting a spare tire. The flag mounting apparatus comprises an attachment plate having a front face and a back face and a plurality of socket holes that align with the holes in the spare tire wheel and the threaded horizontal tire mounting bolt extending through each hole; a plurality of horizontally extending sockets each having a proximal end opening and a distal end opening, wherein the distal end opening of each said horizontally extending socket aligns with and is adapted to receive a corresponding horizontally extending tire mounting bolt and are removably secured to the back face of the attachment plate; and secured to the front face of the attachment plate is at least one flag mount having a longitudinally extending channel for receiving a flag pole is secured to the front face of the attachment plate.

In a preferred embodiment the distal end opening of each horizontally extending socket is threaded and sized to effectively mate with threads of a corresponding threaded horizontally extending tire mounting bolt and the proximal end opening is threaded and sized to effectively mate with threads of a socket attachment bolt that extends through a socket hole in the attachment plate to couple the attachment plate to spare tire mount.

In a preferred embodiment of the invention, wherein each flag mount is removable attached to the attachment plate and can be angled such that a flag pole extends in a direction at an angle from vertical.

In a preferred embodiment the flag mounting apparatus further comprises a flag locking apparatus for locking the flag pole in the longitudinally extending channel.

In a preferred embodiment the at least one flag mount includes a first side opening and an aligned second side opening for receiving a pin that extends through the first side opening and through a hole in the flag pole and out through the aligned second side opening and wherein the pin includes a pin head sized such that it cannot move through the first side opening and a second end that extends through the aligned socket second side opening; and wherein the pin has a pin aperture for receiving a lock that operates to prevent the pin from being removed and securing the flag pole within the longitudinally extending channel of the flag mount.

In a preferred embodiment the flag mounting apparatus further comprises a spare tire locking component that operates to prevent one or more of the threaded socket attachment bolts from being removed thereby locking the spare tire on the spare tire mount on the vehicle.

In a preferred embodiment the spare tire locking component includes a horizontally extending flap attached to the front face of the attachment plate and a cover covering one or more of the horizontal socket attachment bolts and having slot; wherein the horizontally extending flap extends through the slot in the cover and includes an opening for attaching a lock to prevent the horizontally extending flap from sliding through the slot thereby operating to secure the cover against the front face of the attachment plate.

In a preferred embodiment the flag mounting apparatus further comprises a spare tire cover sized to cover at least a portion of the spare tire and wherein the cover includes at least one pole cover opening that operates to allow a flag pole attached to the flag mount to extend therethrough such that a portion of the flag pole is not contained within the cover.

In a preferred embodiment the cover includes a central opening that operates to allow the vehicle back-up camera to operate without interference from the cover.

Another preferred embodiment is a flag mounting apparatus for use with a vehicle having a spare tire and wheel vertically mounted to a tailgate of the vehicle by a spare tire mount having a plurality of horizontally tire mounting bolts extending through corresponding holes in the wheel, the flag mounting apparatus comprises an attachment plate having a front face and a back face with a central opening extending through the attachment plate and a plurality of socket holes that align with corresponding holes in the wheel of the spare tire such that a horizontal tire mounting bolt extending through each corresponding hole; a plurality of horizontally extending sockets each having a proximal end opening and a distal end opening, wherein the distal end of each said horizontally extending socket aligns with and is adapted to receive a corresponding horizontally tire mounting bolt of the spare tire mount and are removably secured to the attachment plate by a socket attachment bolt extending through a corresponding socket hole in the attachment plate for mating with the proximal end opening of the corresponding socket; secured to the front face of the attachment plate is at least one flag mount having a longitudinally extending channel for receiving a flag pole, wherein the at least one flag mount includes a first side opening and an aligned second side opening for receiving a pin that extends through the first side opening and through a hole in the flag pole and out through the aligned second side opening; wherein the pin includes a pin head sized such that it cannot move through the first side opening and a second end that extends through the aligned second side opening and has a pin aperture for receiving a lock that operates to prevent the pin from being removed and securing the flag pole within the at least one flag mount; wherein the flag mounting apparatus further comprises a spare tire locking component having a horizontally extending flap attached to the front face of the attachment plate and a cover covering one or more of the horizontal socket attachment bolts and having slot, wherein the horizontally extending flap extends through the slot in the cover and includes an opening for attaching a lock to prevent the horizontally extending flap from sliding through the slot thereby operating to secure the cover against the front face of the attachment plate.

In a preferred embodiment each flag mount is removable attached to the attachment plate and can be angled such that a flag pole extends in a direction at an angle from vertical.

In a preferred embodiment the flag mounting apparatus further comprises a spare tire cover sized to cover at least a portion of the spare tire and wherein the cover includes at least one pole cover opening that operates to allow a flag pole attached to the flag mount to extend therethrough such that a portion of the flag pole is not contained within the cover.

In preferred embodiment the cover includes a central opening that operates to allow the vehicle back-up camera to operate without interference from the cover.

A preferred embodiment of the invention is a vehicle comprising a plurality of mounting bolts; flag mounting apparatus having an attachment plate and a plurality of sockets connected to the attachment plate and wherein each socket aligns with and mates with a corresponding mounting bolt; a flag mount attached to the attachment plate, wherein the flag mount has a channel for receiving a flag pole; a flag locking apparatus for locking the flag pole in said channel; wherein the flag mount can be rotated to change the direction that the flag pole extends from the flag mounting apparatus.

In aa preferred embodiment the plurality mounting bolts are coupled to a tailgate and extends through a plurality of holes in a wheel.

In preferred embodiment the vehicle has a back-up camera and wherein the attachment plate has an opening such that the camera is positioned such that it takes images through the opening.

In a preferred embodiment the sockets are removably attached to the attachment plate by corresponding socket attachment bolts and wherein the flag mounting apparatus includes a cover plate that covers one or more of the socket attachment bolts and wherein the cover plate can be locked into position covering one or more of the socket attachment bolts.

In a preferred embodiment the vehicle the plurality of mounting bolts operate to support a spare tire and wherein the flag mounting apparatus further comprises a cover that covers a portion of the spare tire and wherein the cover has at least one opening for receiving the flag pole therethrough.

Various other objects, advantages, and embodiments of the invention will be apparent from the following description, the accompanying drawings, and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
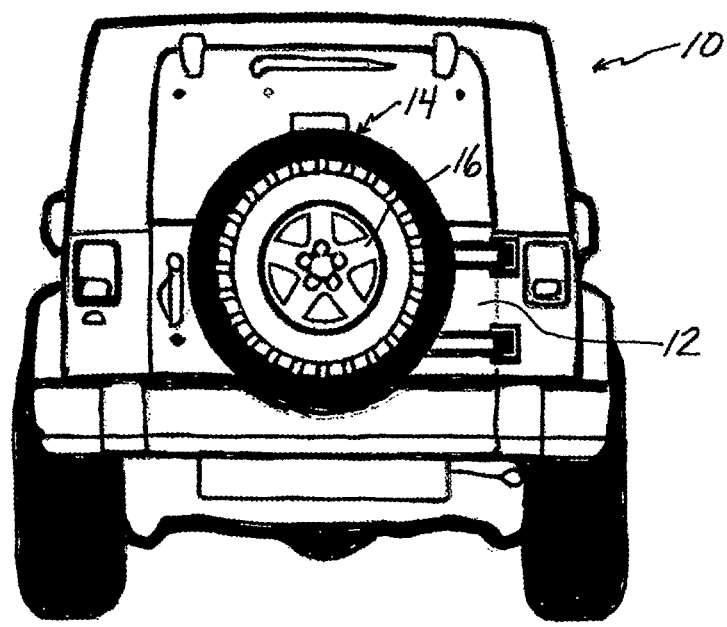
FIG. 1 is a schematic illustration showing a "Jeep" type vehicle having a spare tire mounted to the tailgate of the vehicle.

The subject invention is directed to a mounting apparatus for attaching an object to a vehicle, such as an automobile, and more specifically, to a mounting apparatus for attaching a flag or banner, or other similar pole-type objects, to a "jeep" type vehicle having a spare tire mounted to the tailgate of the vehicle. As used herein the terms "downward" or "downwardly" refer to the direction towards the ground or the surface that the vehicle travels on. The term "generally perpendicular" refers to the angle of about 45 degrees to 90 degrees. The terms "upward" or "upwardly" refer to the direction away from the ground or the surface that the vehicle travels on. The term "vertical" refers to the direction generally perpendicular to the ground and the term "horizontal" refers to the direction parallel to the ground. As used herein, unless otherwise stated herein, the term "flag pole" is not limited to flag poles but includes flag poles, banner poles, signal poles, antennas, and rods and the like. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Figure 2:
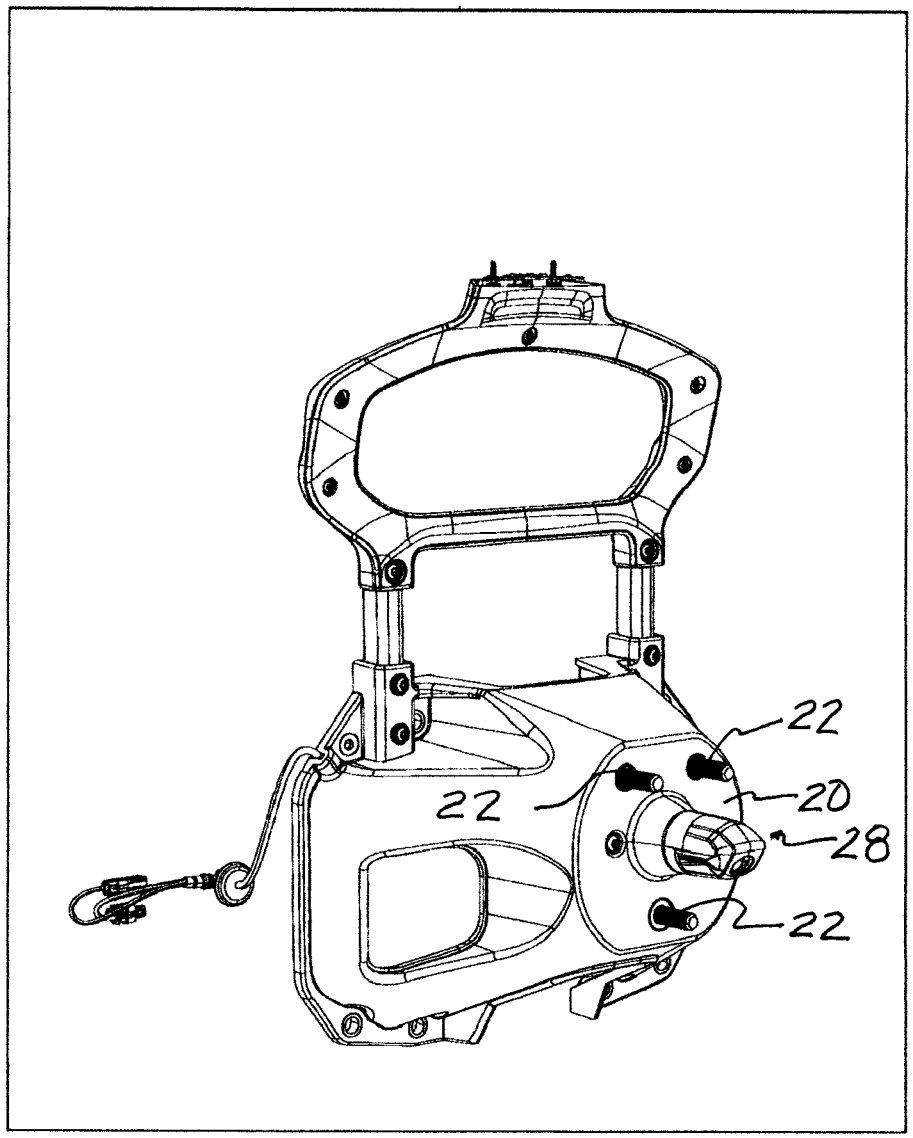
FIG. 2 is a perspective schematic illustration of a portion of a spare tire mount for mounting a spare tire to a tailgate of a vehicle and having a vertical front surface with a plurality of threaded horizontal tire mounting bolts extending from the vertical front surface and a back-up camera.
Figure 3:
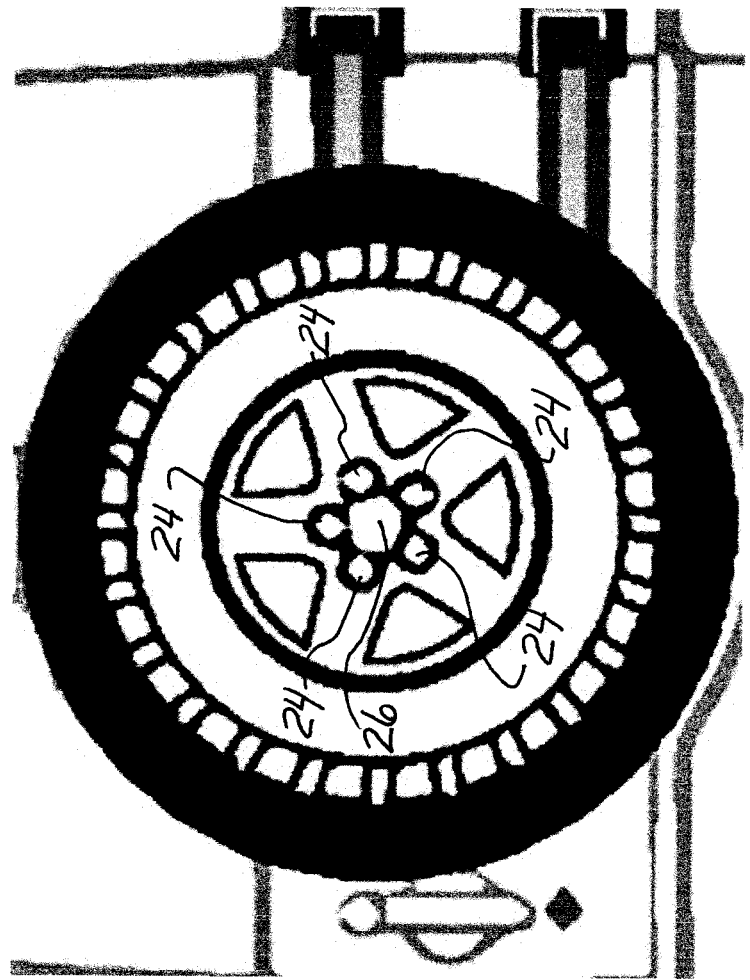
FIG. 3 is a front schematic illustration showing the spare tire and wheel mounted to the tailgate of vehicle having a plurality of horizontal tire mounting bolts extending through holes in the wheel for receiving a corresponding horizontal tire mounting bolt.

Referring to FIGS. 1-3, illustrate a conventional "jeep-type" vehicle 10 having a tailgate 12 and a spare tire 14 and wheel 16 mounted to a spare tire mount 18 attached to the tailgate 12 and having a vertical front surface 20 with a plurality of threaded horizontal tire mounting bolts 22 projecting horizontally outwardly from the vertical front surface 20 and function to extend through corresponding holes 24 in the wheel 16. In one preferred embodiment, holes 24 are equally and concentrically spaced around a central opening 26 in the wheel 16. Extending horizontally outwardly from the vertical front surface 20 of the spare tire mount 18 is a back-up camera 28 that is sized to fit through the central opening 26 and operates to video stream images to a driver's view screen (not shown).

Figure 4:
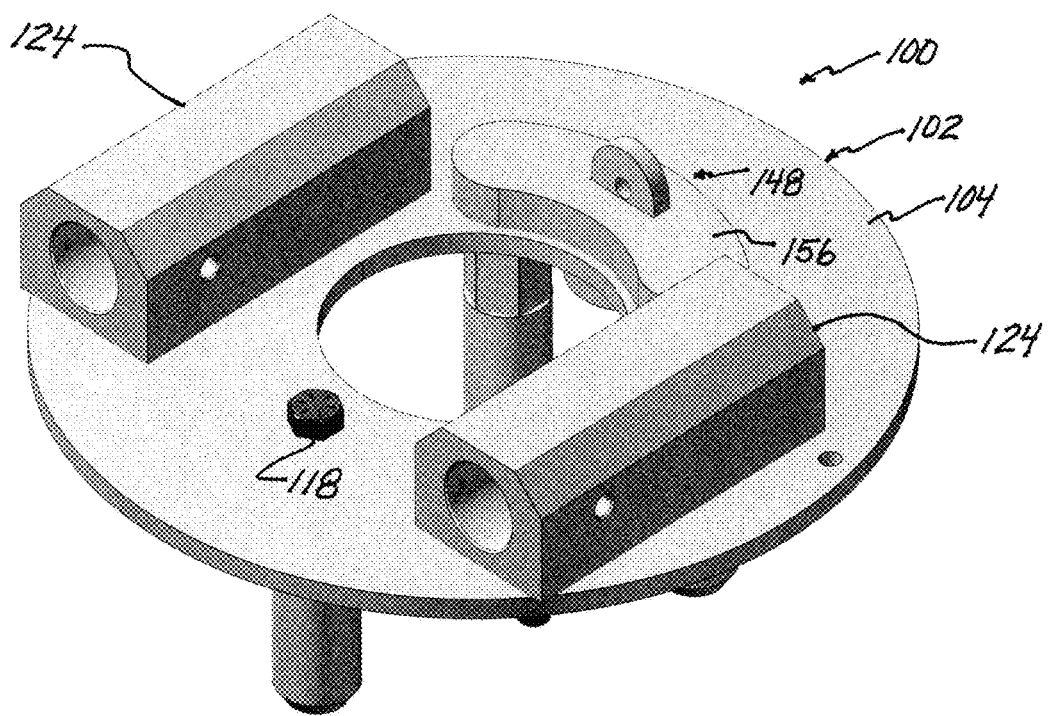
FIG. 4 is a perspective view of the front face of an attachment plate of the flag pole mounting apparatus showing a pair of flag mounts mounted to the front face of the attachment plate and a spare tire locking component illustrating the cover plate in position along the surface of the front face of the attachment plate and covering one or more socket attachment bolts and a tab extending through the slot in the cover plate having an opening for receiving a lock.
Figure 5:
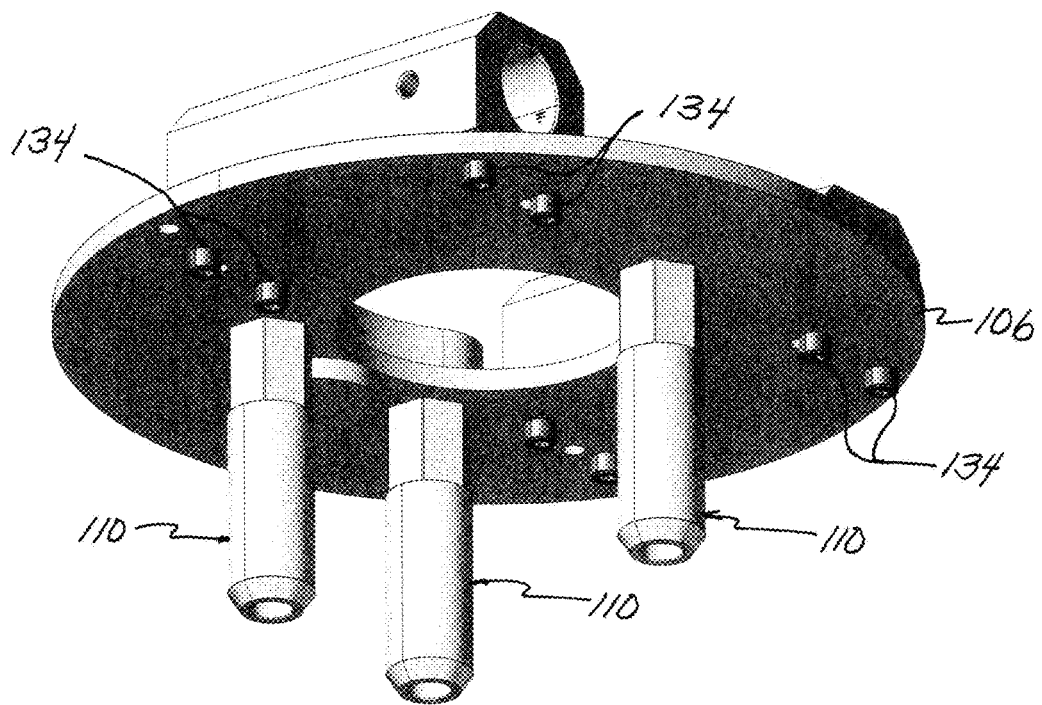
FIG. 5 is an illustration of the back face of the attachment mount showing a plurality of horizontally extending sockets attached to the back face and a plurality of flag mounting bolts for attaching a pair of flag mounts to the front face of the attachment plate and additional number of flag mounting bolts that can be used to mount one or more flag mounts at an angle such that the flag pole extends at an angle from vertical.
Figure 7:
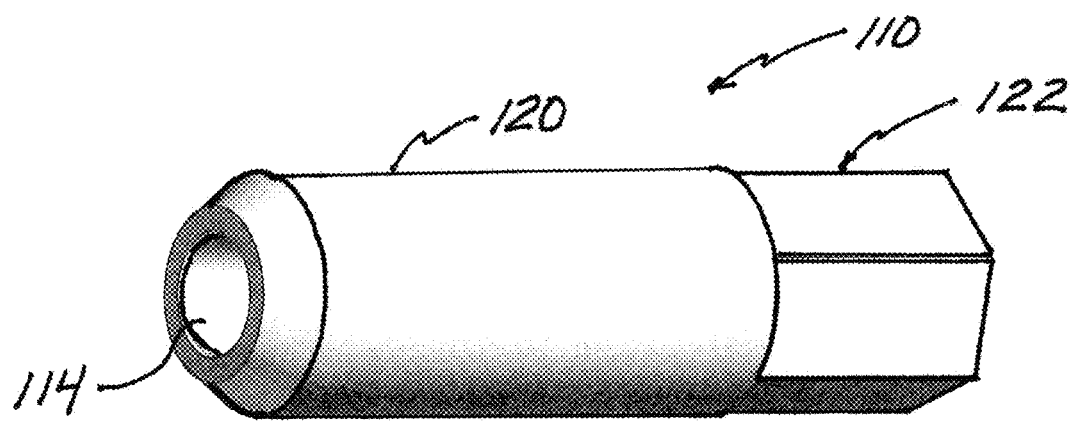
FIG. 7 is a perspective view of a socket having an outer surface with an angular portion and a threaded distal end opening
Figure 8:
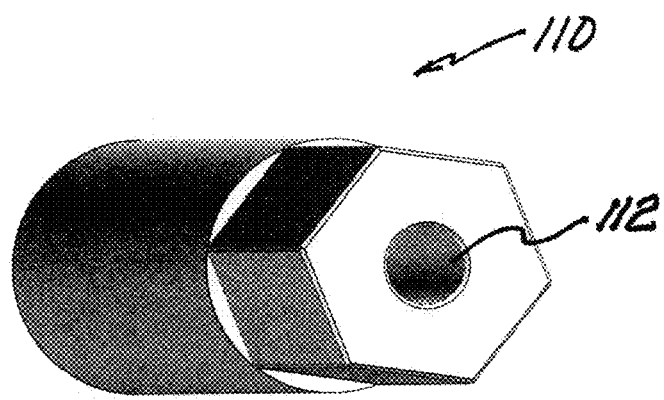
FIG. 8 is a side view perspective illustration of a socket having a proximal end opening and showing the proximal end opening.
Figure 9:
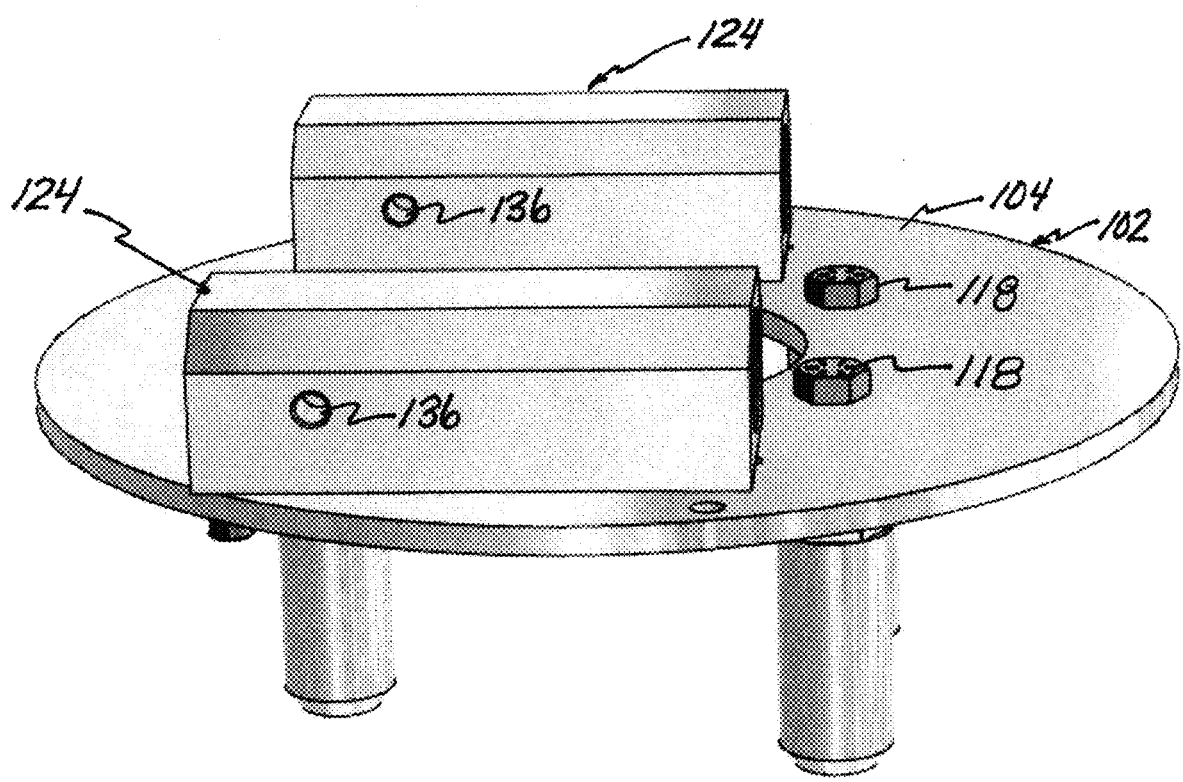
FIG. 9 is a perspective view of the attachment plate showing a pair of flag mounts and two of the socket attachment bolts without the cover plate of the spare tire locking component covering the attachment bolts.

The flag mounting apparatus 100 of the subject invention is shown in FIG. 4 and comprises an attachment plate 102 for attaching to the threaded horizontal tire mounting bolts 22 (FIG. 2) of the spare tire mount 18. The flag mounting apparatus and its various components are preferably formed from steel or aluminum but it should be understood that other materials such as a high-density polyethylene plastic or a combination thereof can be utilized. In a preferred embodiment, as shown in FIGS. 4-8, the attachment plate 102 includes a front face 104 (FIG. 4) and a back face 106 (FIG. 5) and a central opening 108 (FIG. 6) extending through the attachment plate 102. The mounting apparatus 100 includes a plurality of horizontally extending sockets 110 each having a threaded proximal end opening 112 and a threaded distal end opening 114 (FIGS. 7 and 8). The threaded distal end opening 114 of each horizontally extending socket 110 aligns with and is sized and has a thread pitch adapted to receive and mate with a corresponding threaded horizontal tire mounting bolt 22. The threaded proximal end opening 112 of each horizontal extending socket 110 aligns with a corresponding socket hole 116 (FIG. 6) in the attachment plate 102 and are secured to the back face 106 of the attachment plate 102 by a socket attachment bolt 118 (FIGS. 4 and 9) that is sized and have a thread pitch adapted to mate with the threaded proximal end opening 112. As illustrated in FIG. 7, a preferred embodiment the outer surface 120 of each horizontal extending socket 110 includes an angular portion 122. The angular portion 122 of the outer surface 120 has a hexagon or an octagon cross section to aide in using a wrench to tighten or loosen the horizontal extending socket 110 on the corresponding threaded horizontal tire mounting bolt 22.

Figure 10:
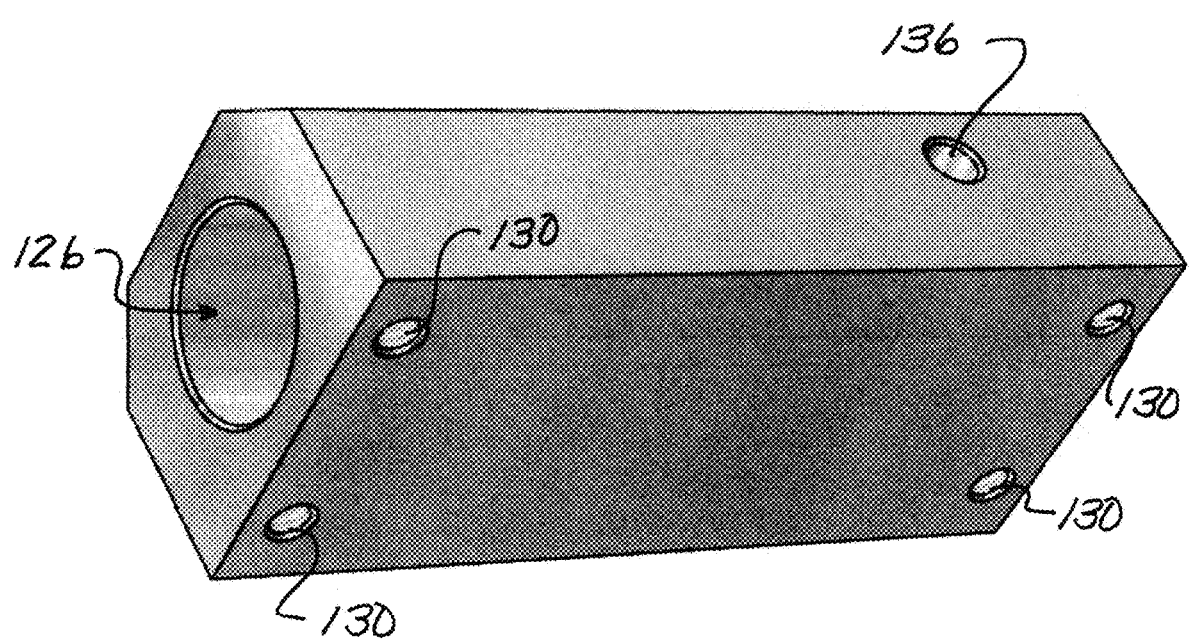
FIG. 10 is a bottom view of a flag mount showing threaded flag mount openings for receiving flag mounting bolts for removably attaching a flag mount to the front face of the attachment plate.
Figure 11:
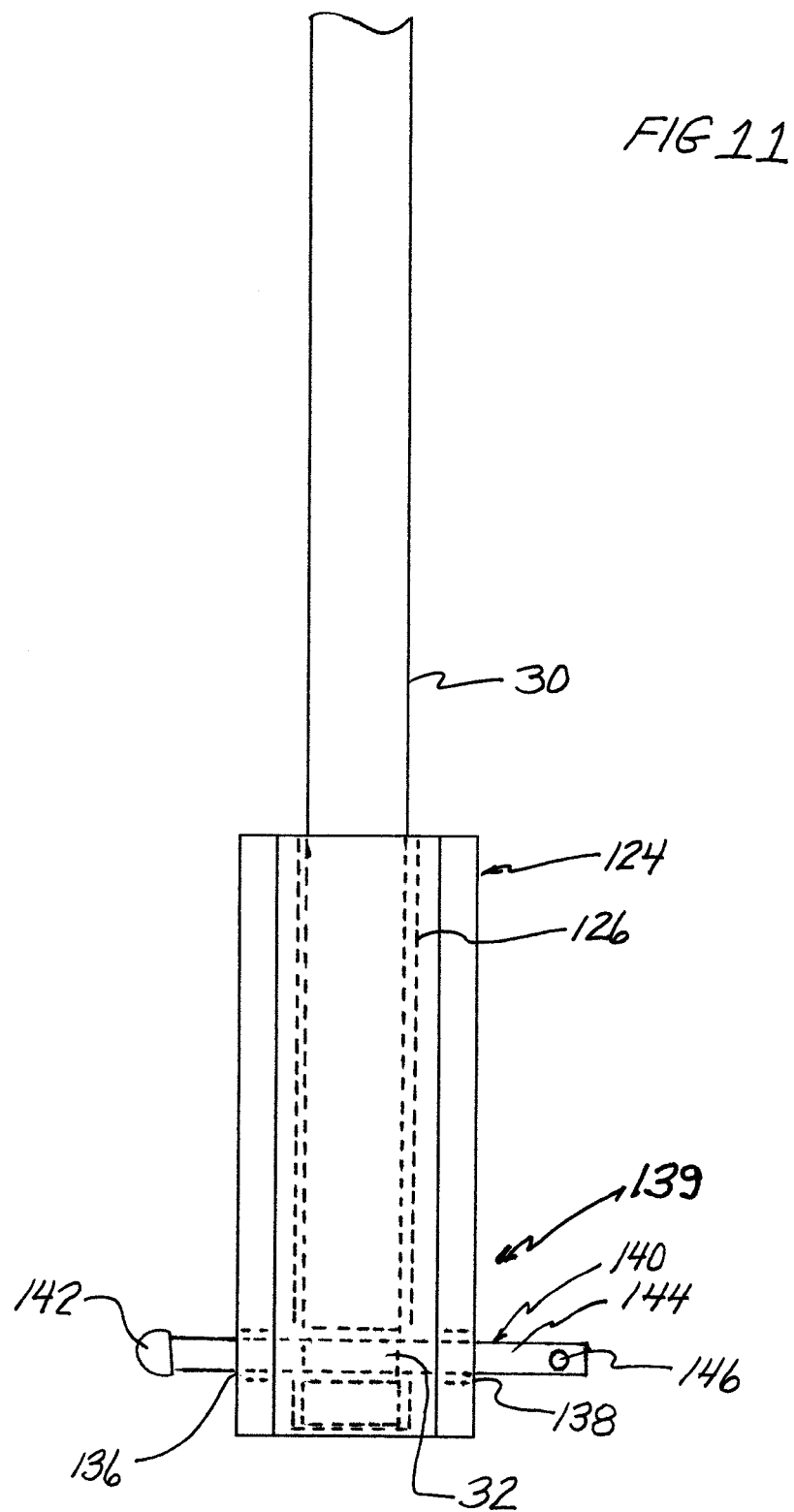
FIG. 11 is a schematic illustration of a flag mount having a flag pole within the longitudinally extending channel and having a pin for inserting through first side opening, the flag pole and the second side opening for securing the flag pole in the channel.
Figure 12:
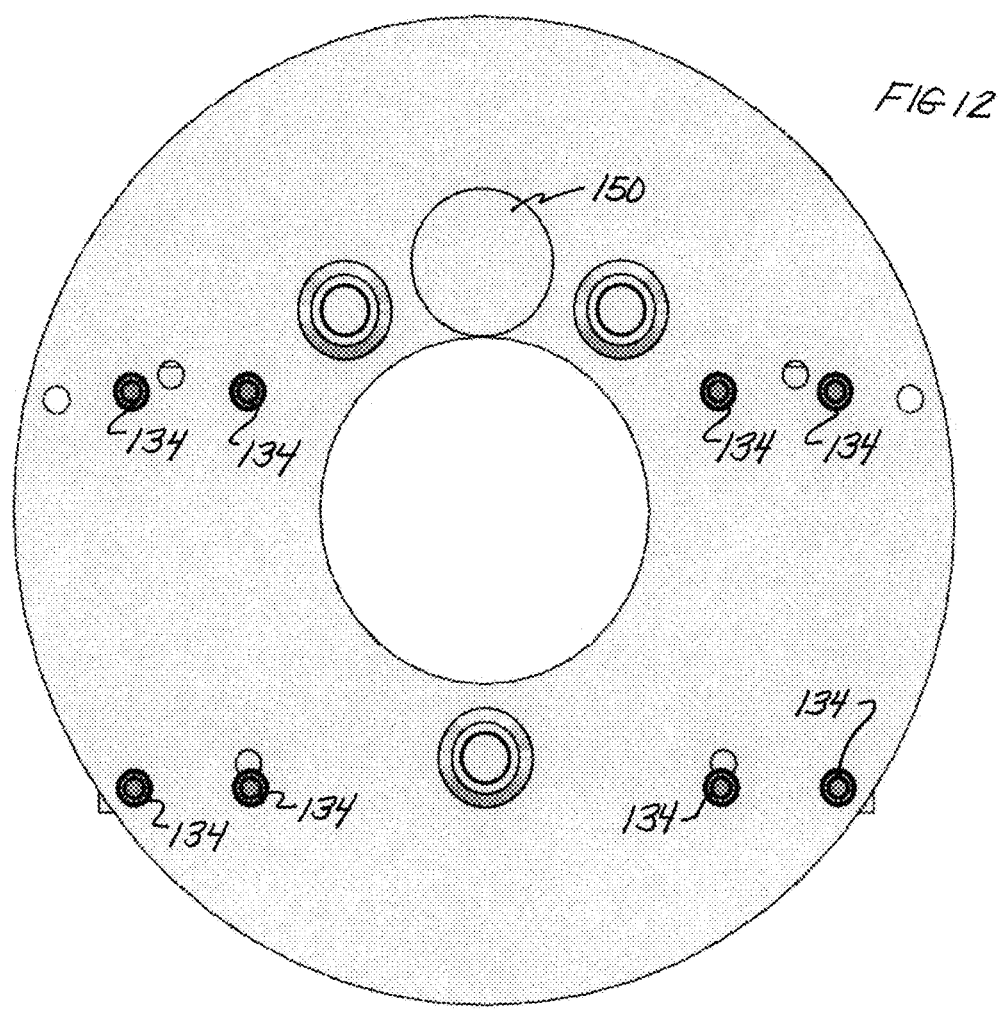
FIG. 12 is an illustration of the back face of the attachment plate showing the distal end of the horizontally extending sockets and the flag mounting bolts for attaching the flag mounts to the attachment plate.

The front face 104 of the attachment plate 102 includes at least one flag mount 124 having a longitudinally extending channel 126 for receiving a flag pole 30 (FIGS. 10 and 11).

Figure 6:
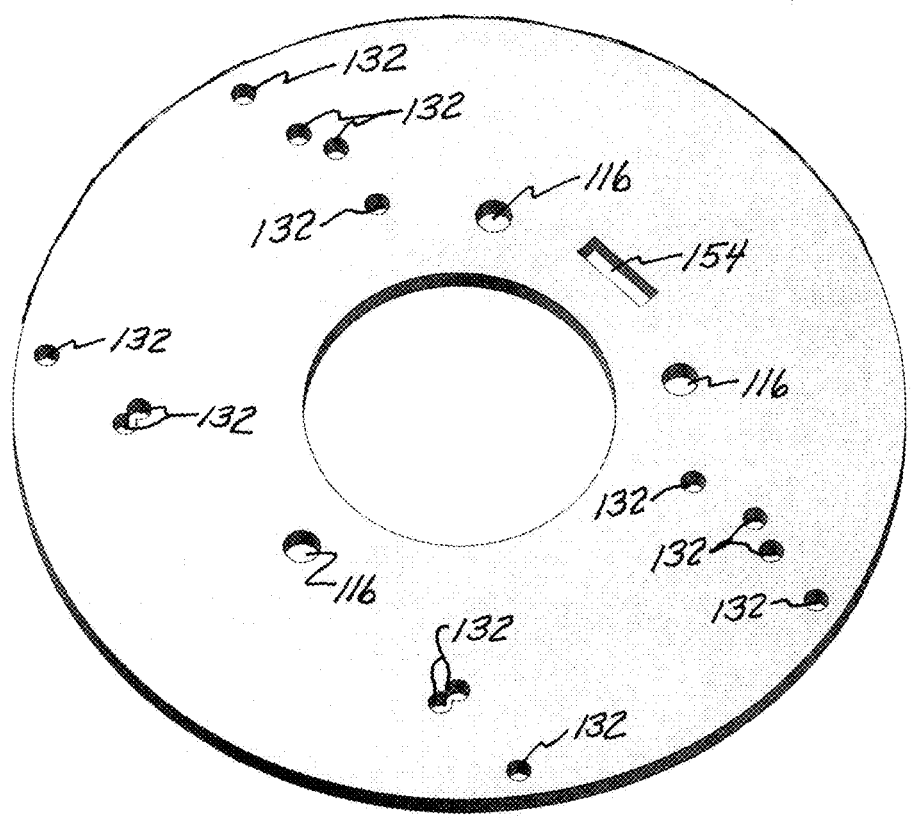
FIG. 6 is an illustration of the attachment plate showing a plurality of holes, openings and a slot used for attaching one or more components thereon.

The bottom surface 128 of the flag mount 124 includes a plurality of flag mount threaded holes 130 that align with corresponding flag mount opening 132 in the attachment plate 102 (FIG. 6). A flag mounting bolt 134 extends through a corresponding flag mount opening 132 (FIGS. 5 and 6) and is sized and has a thread pitch for mating with a corresponding flag mount threaded hole 130 for securely attaching the flag mount 124 to the front face 104 of the attachment plate 102. In a preferred embodiment of the invention, the attachment plate 102 includes additional flag mount openings 132 that operate to allow a flag mount 124 to be attached at an angle using one or more of the additional flag mount openings 132. It should now be understood to one skilled in the art that the additional flag mount threaded holes allow the flag mount to be attached at an angle from vertical thereby allowing a flag or banner pole, antenna and the like to be positioned at an angle (such as between 20°-45° from vertical). It should also be understood to one skilled in the art that the number of additional flag mount openings that may be provided is not limited to the number as shown but additional flag mount openings may be provided to permit the flag mounts to be mounted at additional angles.

Figure 13:
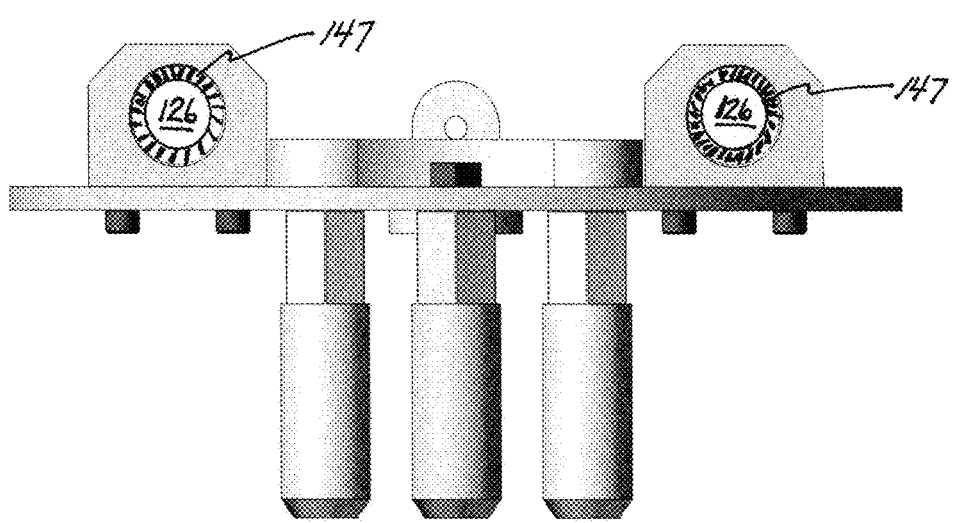
FIG. 13 is an end side view of the attachment plate showing a pair of flag mounts attached thereon each having a longitudinally extending channel with a rubber-type cushion positioned along the wall within the channel such that the channel can accommodate different diameter size flag poles while maintaining a sufficient frictional fit to prevent the flag pole from slipping out of the channel during use.
Figure 14:
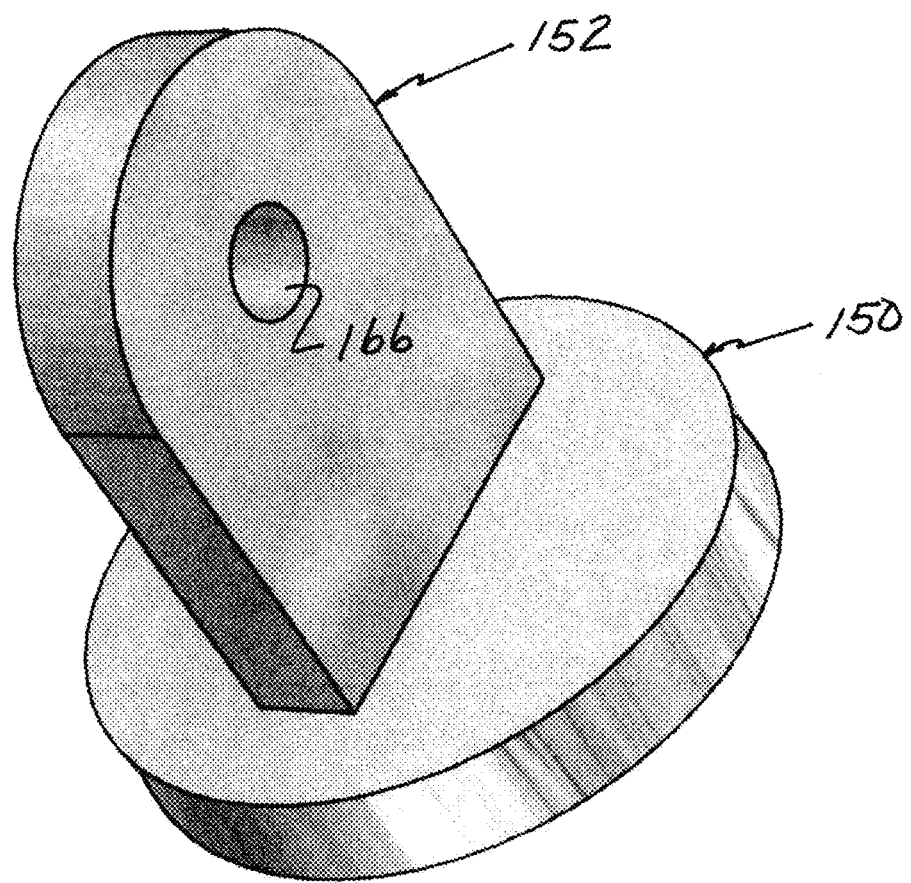
FIG. 14 is perspective illustration of a lock attachment having a base and a flap extending perpendicular from the base and having an opening at outer end.
Figure 15:
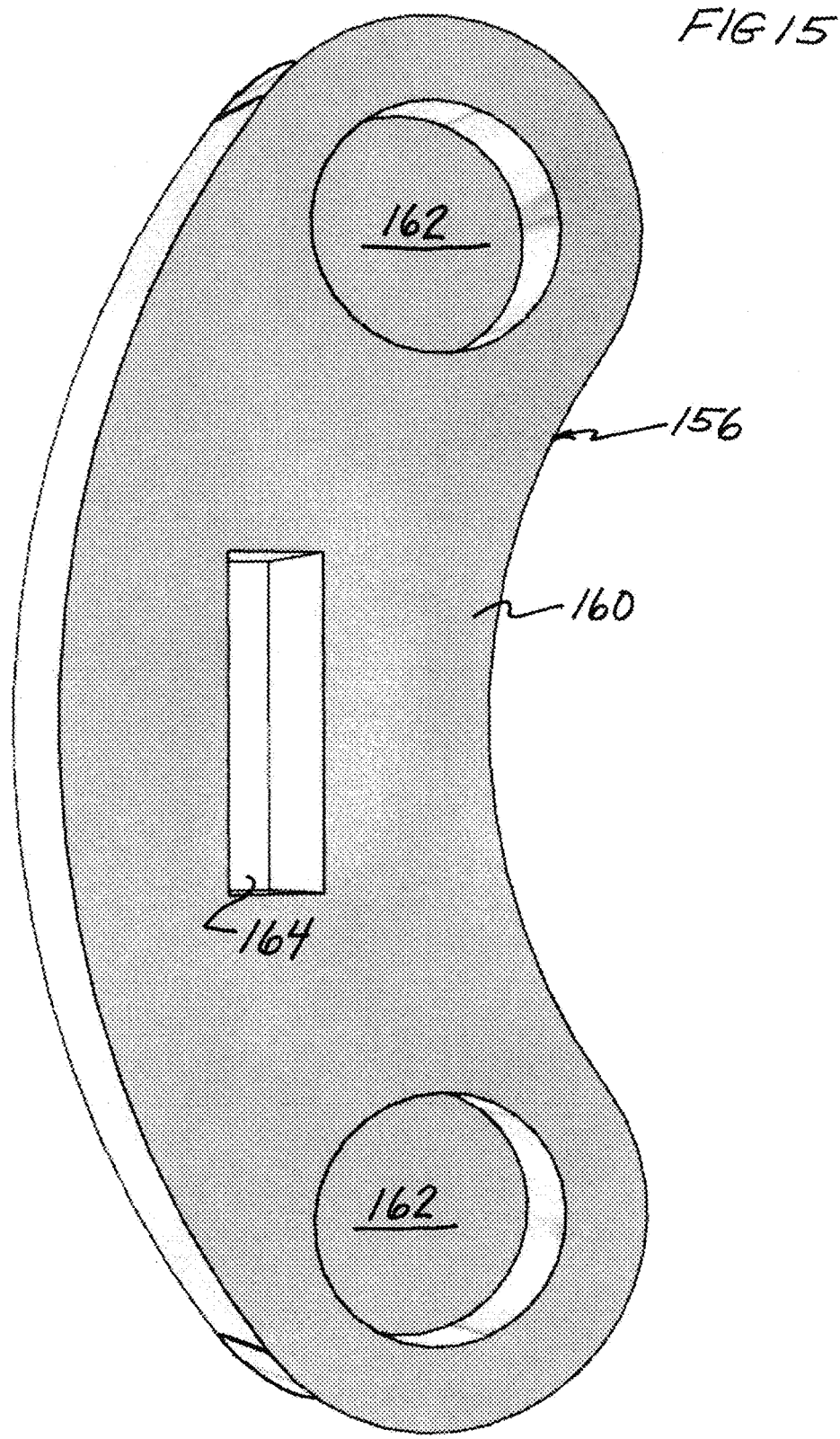
FIG. 15 is a back view of a cover of the spare tire locking component having a slot for receiving the flap of the lock attachment and a pair of recesses for placement over corresponding socket attachment bolts for attaching a pair of horizontally extending sockets to the back face of the attachment plate.
Figure 16:
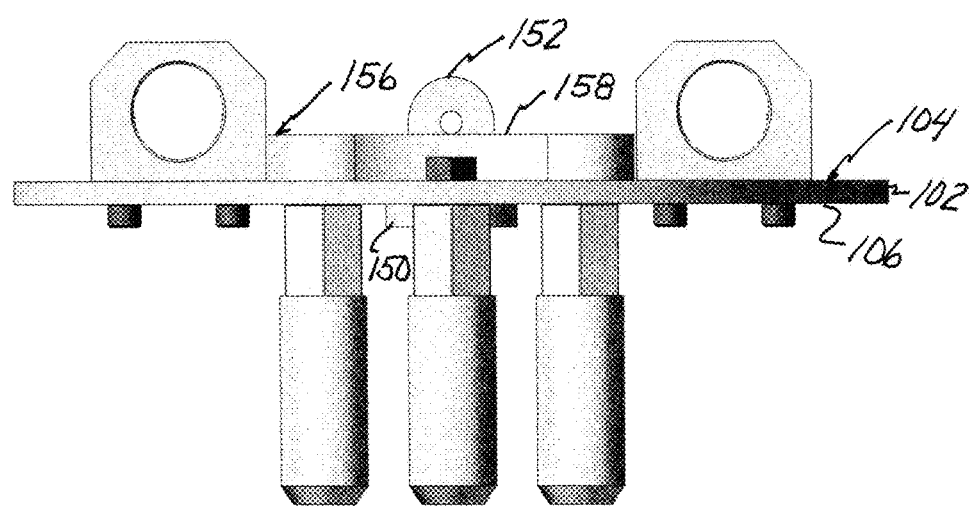
FIG. 16 is an end side view of the attachment plate showing a pair of flag mounts attached thereon each having a longitudinally extending channel for receiving a flag pole and a a spare tire locking component attached to the attachment plate.

Referring to FIG. 11, preferably each flag mount 124 includes a flag locking apparatus 139 having a first side opening 136 positioned on one side of the flag mount and is aligned with a second side opening 138 on the opposite side of the flag mount and are adapted for receiving a pin 140 that extends through the first side opening 136 and through a hole 32 in a flag pole 30 and out through the aligned second side opening 138. The pin 140 includes a pin head 142 sized such that it cannot move through the first side opening 136 and a second end 144 that extends through the aligned second side opening 138 and has an aperture 146 in the second end 144 for receiving a lock (not shown) that operates to prevent the pin 140 from being removed and securing a flag pole 30 within the longitudinally extending channel 126 of the flag mount 124. It should now be apparent to one skilled in the art that by connecting a lock to the aperture in the pin prevents the unauthorized removal of the flag pole from the flag mount and ensures that the flag pole remains in the longitudinally extending channel during use of the vehicle. In another preferred embodiment of the invention the flag pole 30 is secured in place in the longitudinally extending channel 126 by using a flag pole having a diameter nearly the same of slightly smaller than the inside diameter of the longitudinally extending channel such that the flag pole is secured within the channel by a frictional fit sufficient to maintain the flag pole in position within the channel during use of the vehicle. In another preferred embodiment, as shown if FIG. 13, the longitudinally extending channel 126 includes an elastic or rubber-type cushion or a removable sleeve 147 positioned along the surface of the longitudinally extending channel 126 such that the channel can accommodate different diameter size flag poles while maintaining a sufficient frictional fit to prevent the flag pole from slipping out of the channel during use. It should now be apparent that the cushion allows for different size flag poles to be inserted or a proper sized removable sleeve can be selected to allow for different flag poles having different diameters to be inserted into the channel such that it produces a frictional fit sufficient to maintain the flag pole in the channel during use of the vehicle while also allowing the flag pole to be easily inserted and removed.

In another preferred embodiment of the invention, as shown in FIGS. 4, 9, 12 and 14-16, the mounting apparatus 100 includes a spare tire locking component 148 that includes a base portion 150 positioned parallel to and along the back face 106 of the attachment plate 102 and includes a tab 152 extending perpendicular to the base portion 150 and extends through a slot 154 (FIG. 6) in the attachment plate 102. The spare tire locking component 148 further includes a cover plate 156 having a front surface 158 and a back surface 160. The back surface 160 includes recesses 162 for receiving and covering one or more of the socket attachment bolts 118. A slot 164 extends through the front surface 158 and the back surface 160 of the cover plate 156 and are sized to receive corresponding socket attachment bolts 118 when the cover is placed along the front face 104. When in its proper position, the cover plate 156 is positioned such that the cover slot 164 is aligned with the slot 154 in the attachment plate 102 and is sized to allow the tab 152 to pass through the slot 154 and cover slot 164. The tab 152 includes an opening 166 for attaching a lock (not shown) thereby preventing the tab 152 from sliding back through the cover slot 164 and slot 154 in the attachment plate 102 thereby operating to secure the cover plate 156 against the front face 104 of the attachment plate 102. It should now be apparent to one skilled in the art that the cover plate operates to prevent the removal of the socket attachment bolts 118 without unlocking and removing the cover plate thereby preventing the unauthorized removal of the spare tire.

Figure 17:
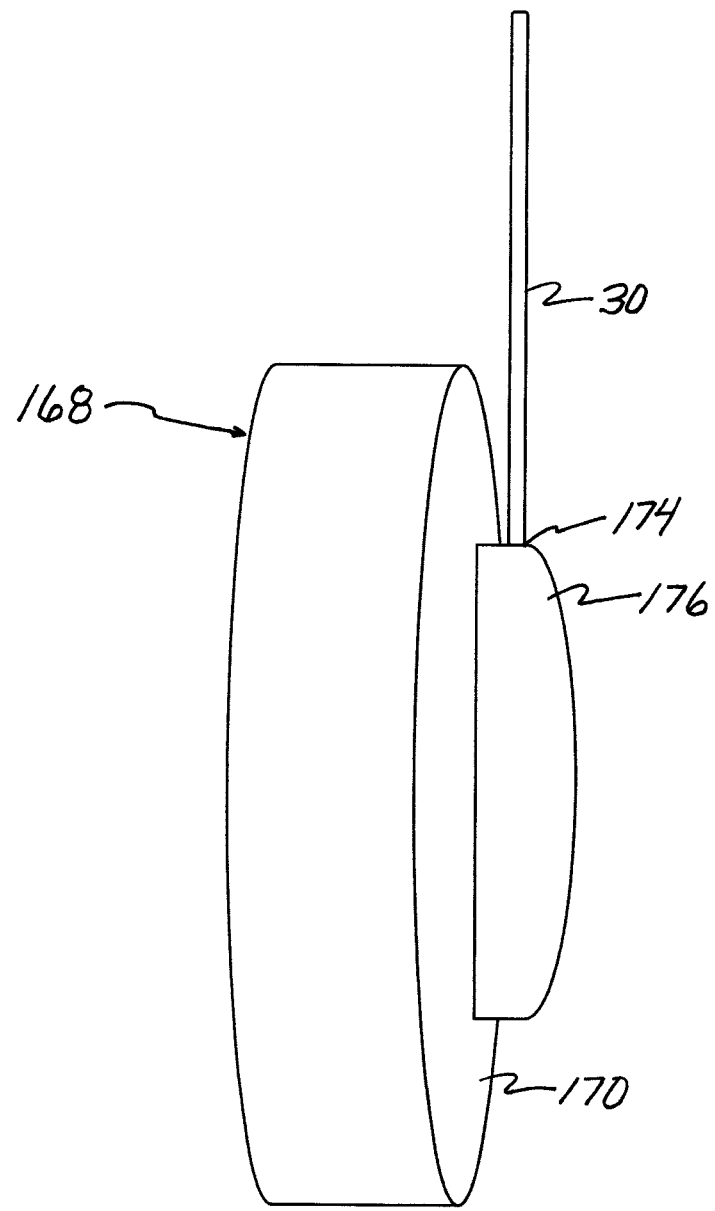
FIG. 17 is a view of a spare tire cover showing a back flap portion that extends over the back side of the spare tire, a front cover portion that covers the front side of the spare tire and wheel and includes a bulge area adapted to fit over the attachment plate and the at least one flag mount, and a side portion that connects the back flap portion and the front cover portion and covers the treads of the spare tire, and further illustrating a flag pole extending outwardly through a cover openings.
Figure 18:
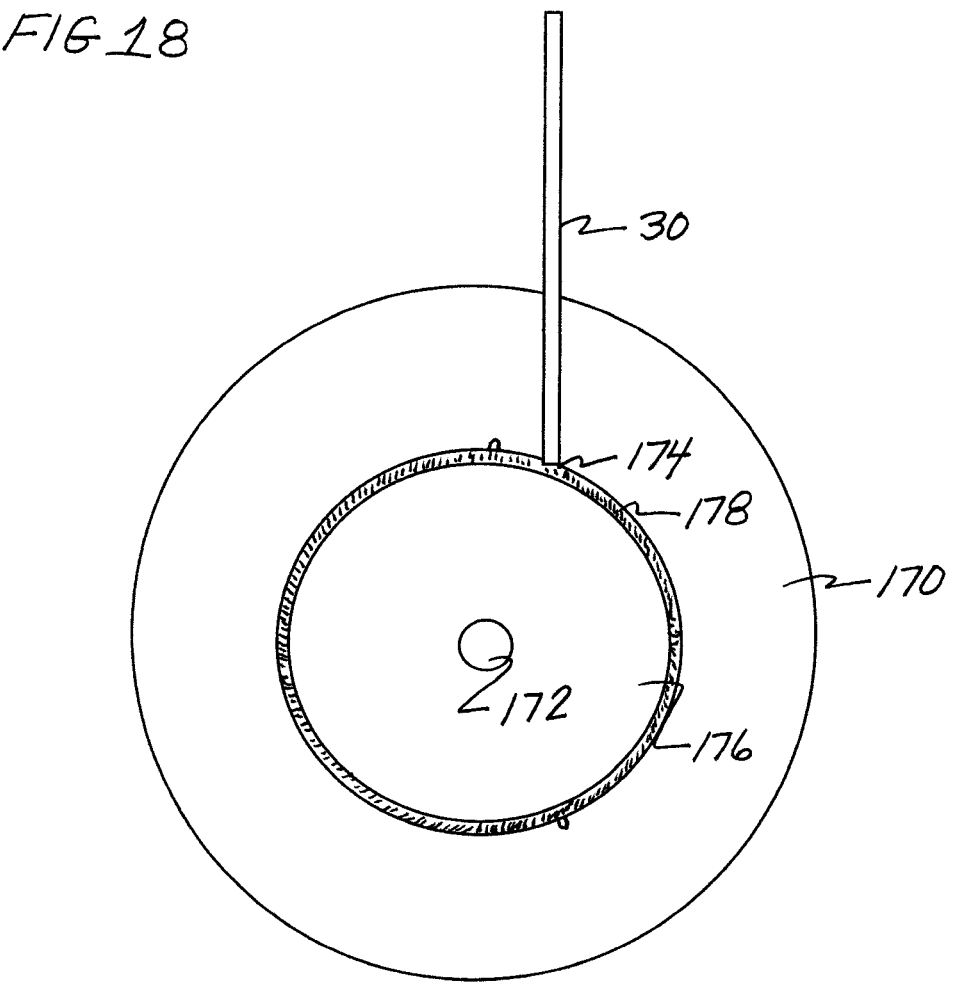
FIG. 18 is a front view of the spare tire cover showing the bulge area showing a central opening for receiving a bac-up camera at least one cover opening for allowing a flag pole to extend outwardly from the cover and an apparatus opening and closing component for allowing a user to attach or remove the flag mounting apparatus without removing the cover.

Referring to FIGS. 17-18, the flag mounting apparatus 100 further includes a spare tire cover 168 that is sized to fit over the spare tire 14. Preferably, the spare tire cover 168 is formed from a heavy-duty vinyl material, such as a UV resistant marine-grade vinyl. In a preferred embodiment of the invention, as shown, the spare tire cover 168 includes a front cover portion 170 having a central cover opening 172 that permits the back-up camera 28 to extend outwardly thereby not hindering or preventing operation of the back-up camera 28. The spare tire cover 168 further includes one or more cover openings 174 positioned along a bulge area 176 along the front cover portion 170. It should be understood that the bulge area 176 is sized such that it covers the attachment plat 162, the horizontally extending sockets 110 and the flag mounts 124 of the flag mounting apparatus 100. The cover openings 174 are positioned along the bulge area 176 such that when a flag pole 30 is positioned within the longitudinally extending channel 126 of a flag mount 124, it extends outwardly through one of the cover openings 174. In another preferred embodiment, the bulge area 176 includes an apparatus opening and closing component 178, such as a zipper, that allows access to the flag mounting apparatus without the need to remove the spare tire cover from the spare tire.

Figure 19:
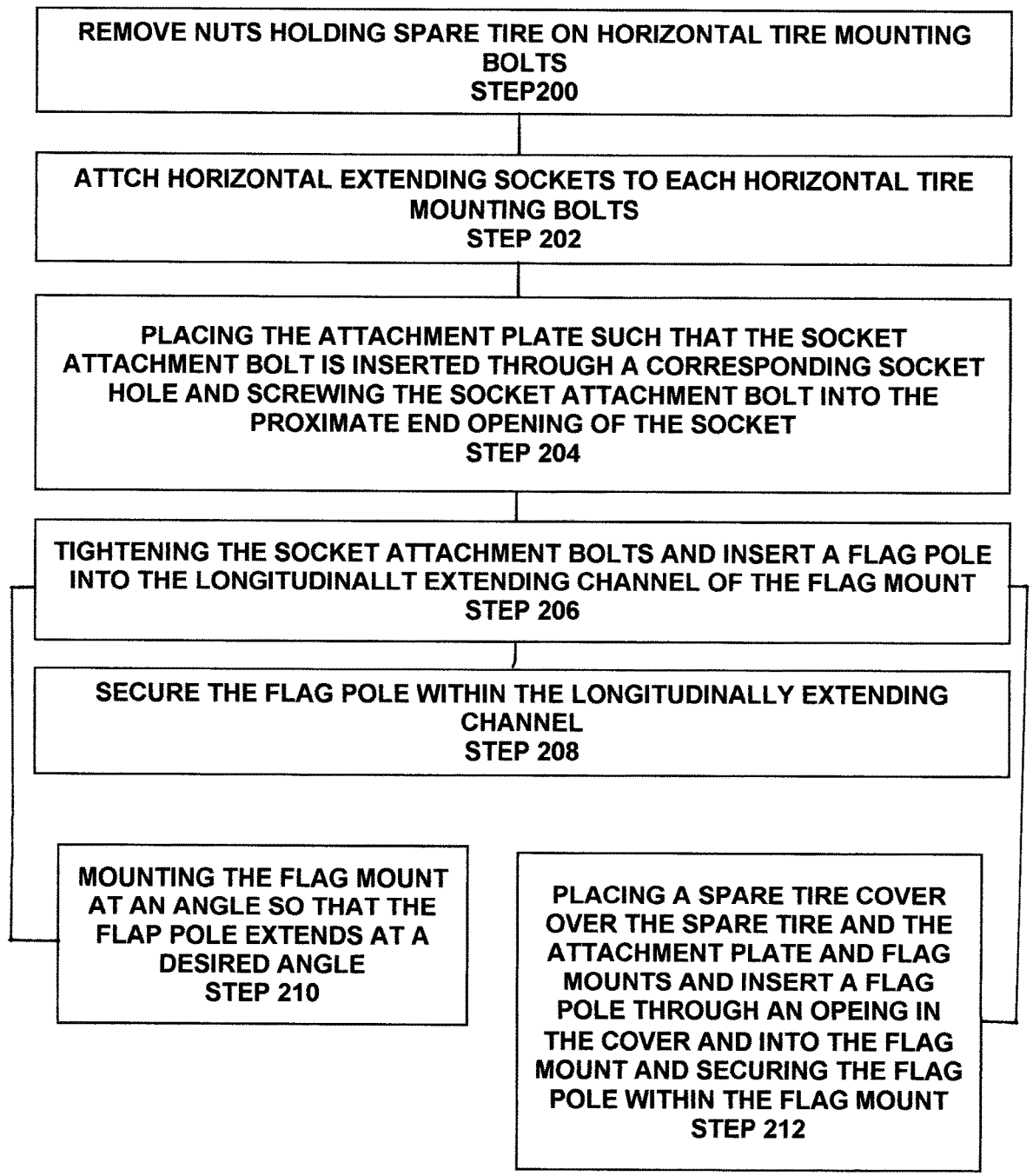
FIG. 19 illustrates the methodology of operation of a preferred embodiment utilizing the various components of the invention of mounting a flag pole to a vehicle.

Referring to FIG. 19, installing the flag mounting apparatus on a conventional "jeep-type" vehicle having a tailgate and a spare tire and wheel mounted to a spare tire mount attached to the tailgate is performed by removing the nuts from the horizontal tire mounting bolts projecting horizontally outwardly from the vertical front surface of the spare tire mount and extending through corresponding holes in the wheel that operate to hold the spare tire in place on the tire mounting bolts (STEP 200). After the tire mounting nuts have been removed, a horizontal extending socket is then attached to each tire mounting bolt by screwing the threaded distal end opening onto the tire mounting bolt (STEP 202). The attachment plate is them placed in position such that each horizontal extending socket aligns with a corresponding socket hole in the attachment plate and are then secured along the back face of the attachment plate by inserting a socket attachment bolt through the corresponding socket hole and screwing the socket attachment bolt into the proximal end opening of the corresponding horizontal extending socket (STEP 204). It should now be apparent that the angular portion of the socket permits a user to use easily a wrench, pliers, or other similar tool to tighten the sockets to the tire mounting bolts and to the socket attachment bolt. Once the attachment plate has been tightly attached to the mounting bolts for the spare tire using the sockets, a flag pole can then be inserted into the longitudinally extending channel of a flag mount (STEP 206) and secured in place such that it will not slip out of the channel during use (STEP 208). In a preferred embodiment, one or more of the flag mounts can be moved, rotated, such that a flag pole extending out of the channel is not vertical but is at an angle from vertical (STEP 210). In another preferred embodiment, a spare tire cover is placed over the spare tire and the mounted attachment plate and at least one flag pole is inserted through a cover opening such that it extends outwardly from the spare tie cover (STEP 212).

It should now be apparent that the flag mounting apparatus of the subject invention provides a desirable apparatus for attaching a flag or banner, or other similar objects of different sizes, to a "jeep" type vehicle having a spare tire mounted to the tailgate of the vehicle, that can support various size objects, that is stable and secure at different driving speeds and terrain, that can be easily attached and detached to the vehicle, and will not interfere with the operation of a factory installed backing camera, and is relatively inexpensive to manufacture. The flag mounting apparatus operates to allow one or more flags to be mounted thereon and can be adjusted such that one or more flags can be maintained in a vertical position or can be positioned at an angle from vertical. Further, the flag mounting apparatus allows a flag to be mounted and locked in a flag mount to help maintain the flag in position on the flag mount and will not dislodge or become detached during high vehicle speeds and rough driving terrain. The flag mounting apparatus also provides a system for locking the flag pole on the apparatus to reduce the possibility of theft but also further ensures that the flag will not dislodge or become detached during use of the vehicle. It should also now be apparent that the flag mounting apparatus also can be used to help protect the spare tire from theft. It should also be apparent that the flag mounting apparatus of the subject invention can include a cover for protecting the spare tire, such as from harmful UV rays that can deteriorate the spare tire over time, which can also improve the appearance of the vehicle, while also permitting one or more flag poles to be attached to the flag pole mounting apparatus while maintaining the cover over the spare tire.

Although the foregoing invention has been described in some detail for purposes of clarity of understanding, it will be apparent that certain changes and modifications may be practiced within the scope of the appended claims. Furthermore, it should be noted that there are alternative ways of implementing both the method and system for implementing the method of the present invention. Accordingly, the present embodiments are to be considered illustrative and not restrictive, and the invention is not to be limited to the details given herein, but may be modified within the scope and equivalents of the subject invention.

The invention claimed is:

1. A flag mounting apparatus for mounting to a spare tire mount attached to a tailgate of a vehicle and having a vertical front surface with a plurality of threaded horizontal tire mounting bolts that extend from the vertical front surface and aligned with and extend through holes in a spare tire wheel for supporting a spare tire, the flag mounting apparatus comprising:

an attachment plate having a front face and a back face and a plurality of socket holes that align with the holes in the spare tire wheel and a threaded horizontal tire mounting bolt extending through each hole;

a plurality of horizontally extending sockets each having a proximal end opening and a distal end opening, wherein said distal end opening of each said horizontally extending socket aligns with and is adapted to receive the corresponding horizontally extending tire mounting bolt and are wherein said proximal end opening is removably secured to said back face of said attachment plate; and secured to the front face of the attachment plate is at least one flag mount having a longitudinally extending channel for receiving a flag pole is secured to said front face of said attachment plate.

2. The flag mounting apparatus of claim 1 wherein said distal end opening of each horizontally extending socket is threaded and sized to effectively mate with threads of a corresponding threaded horizontally extending tire mounting bolt and said proximal end opening is threaded and sized to effectively mate with threads of a socket attachment bolt that extends through a socket hole in said attachment plate to couple said attachment plate to spare tire mount.

3. The flag mounting apparatus of claim 1 wherein each said flag mount is removable attached to said attachment plate and can be angled such that a flag pole extends in a direction at an angle from vertical.

4. The flag mounting apparatus of claim 1 further comprising a flag locking apparatus for locking the flag pole in said longitudinally extending channel.

5. The flag mounting apparatus of claim 1 wherein said at least one flag mount includes a first side opening and an aligned second side opening for receiving a pin that extends through said first side opening and through a hole in the flag pole and out through said aligned second side opening;

wherein said pin includes a pin head sized such that it cannot move through said first side opening and a second end that extends through said aligned socket second side opening; and wherein said pin has a pin aperture for receiving a lock that operates to prevent said pin from being removed and securing the flag pole within said longitudinally extending channel of said flag mount.

6. The flag mounting apparatus of claim 1 further comprises a spare tire locking component that operates to prevent one or more of the threaded socket attachment bolts from being removed thereby locking the spare tire on the spare tire mount on the vehicle.

7. The flag mounting apparatus of claim 6 wherein said spare tire locking component includes a horizontally extending flap attached to the front face of said attachment plate and a cover covering one or more of said horizontal socket attachment bolts and having slot;

wherein said horizontally extending flap extends through said slot in said cover and includes an opening for attaching a lock to prevent said horizontally extending flap from sliding through said slot thereby operating to secure said cover against said front face of said attachment plate.

8. The flag mounting apparatus of claim 1 further comprising a spare tire cover sized to cover at least a portion of the spare tire and wherein said cover includes at least one pole cover opening that operates to allow a flag pole attached to said flag mount to extend therethrough such that a portion of the flag pole is not contained within said cover.

9. The flag mounting apparatus of claim 8 wherein said cover includes a central opening that operates to allow the vehicle back-up camera to operate without interference from said cover.

10. A flag mounting apparatus for use with a vehicle having a spare tire and wheel vertically mounted to a tailgate of the vehicle by a spare tire mount having a plurality of horizontal tire mounting bolts extending through corresponding holes in the wheel, the flag mounting apparatus comprising:
- an attachment plate having a front face and a back face with a central opening extending through said attachment plate and a plurality of socket holes that align with corresponding holes in the wheel of the spare tire such that one of said horizontal tire mounting bolts extends through each corresponding hole;
- a plurality of horizontally extending sockets each having a proximal end opening and a distal end opening, wherein said distal end of each said horizontally extending socket aligns with and is adapted to receive a corresponding horizontally tire mounting bolt of the spare tire mount and are removably secured to the attachment plate by a socket attachment bolt extending through a corresponding socket hole in said attachment plate for mating with said proximal end opening of said corresponding socket;
- secured to said front face of said attachment plate is at least one flag mount having a longitudinally extending channel for receiving a flag pole, wherein said at least one flag mount includes a first side opening and an aligned second side opening for receiving a pin that extends through said first side opening and through a hole in the flag pole and out through said aligned second side opening;
- wherein said pin includes a pin head sized such that it cannot move through said first side opening and a second end that extends through said aligned second side opening and has a pin aperture for receiving a lock that operates to prevent said pin from being removed and securing the flag pole within said at least one flag mount;
- wherein the flag mounting apparatus further comprises a spare tire locking component having a horizontally extending flap attached to said front face of said attachment plate and a cover covering one or more of said horizontal socket attachment bolts and having slot, wherein said horizontally extending flap extends through said slot in said cover and includes an opening for attaching a lock to prevent said horizontally extending flap from sliding through said slot thereby operating to secure said cover against said front face of said attachment plate.

11. The flag mounting apparatus of claim 10 wherein each said flag mount is removable attached to said attachment plate and can be angled such that a flag pole extends in a direction at an angle from vertical.

12. The flag mounting apparatus of claim 10 further comprising a spare tire cover sized to cover at least a portion of the spare tire and wherein said cover includes at least one pole cover opening that operates to allow a flag pole attached to said flag mount to extend therethrough such that a portion of the flag pole is not contained within said cover.

13. The flag mounting apparatus of claim 12 wherein said cover includes a central opening that operates to allow the vehicle back-up camera to operate without interference from said cover.

14. A vehicle comprising:
- a plurality of mounting bolts;
- a flag mounting apparatus having an attachment plate and a plurality of sockets connected to said attachment plate and wherein each said socket aligns with and mates with a corresponding mounting bolt;
- a flag mount attached to said attachment plate, wherein said flag mount has a channel for receiving a flag pole; and
- a flag locking apparatus for locking said flag pole in said channel;
- wherein said flag mount can be rotated to change the direction that said flag pole extends from said flag mounting apparatus.

15. The vehicle of claim 14 wherein said plurality mounting bolts are coupled to a tailgate and extends through a plurality of holes in a wheel.

16. The vehicle of claim 14 wherein the vehicle has a back-up camera and wherein said attachment plate having an opening such that said camera is positioned such that it takes images through said opening.

17. The vehicle of claim 14 wherein said sockets are removably attached to said attachment plate by corresponding socket attachment bolts and wherein said flag mounting apparatus includes a cover plate that covers one or more of said socket attachment bolts and wherein said cover plate can be locked into position covering one or more of said socket attachment bolts.

18. The vehicle of claim 14 wherein said plurality of mounting bolts operate to support a spare tire and wherein said flag mounting apparatus further comprises a cover that covers a portion of said spare tire and wherein said cover has at least one opening for receiving said flag pole therethrough.

* * * * *